United States Patent [19]

Green

[11] Patent Number: 4,615,531
[45] Date of Patent: Oct. 7, 1986

[54] DOUBLE RING PISTON SEALING ARRANGEMENT

[76] Inventor: George D. Green, 0603 County Rd. 221, Rifle, Colo. 86150

[21] Appl. No.: 702,780

[22] Filed: Feb. 19, 1985

[51] Int. Cl.⁴ .............................................. F16J 9/16
[52] U.S. Cl. .................................. 277/216; 277/197; 277/220
[58] Field of Search ................. 277/197, 216, 219–222

[56] References Cited

U.S. PATENT DOCUMENTS

| | | |
|---|---|---|
| 1,865,566 | 7/1932 | Hodge .................................. 277/197 |
| 3,991,455 | 11/1976 | Bergeron ............................. 277/197 |

FOREIGN PATENT DOCUMENTS

| | | | |
|---|---|---|---|
| 495503 | 8/1953 | Canada ................................ 277/197 |
| 52-1357 | 1/1977 | Japan .................................. 277/216 |
| 1315831 | 5/1973 | United Kingdom ................ 277/220 |

Primary Examiner—Robert S. Ward
Attorney, Agent, or Firm—Henderson & Sturm

[57] ABSTRACT

An improved dual ring sealing arrangement (10) for a piston head (17) having at least one circumferential groove (15) formed therein, wherein the arrangement comprises a first sealing ring (13) having a recess (23) adapted to receive a protrusion (22) formed on the second sealing ring (14), whereby the respective ring gaps (20) are off-set from one another when said first and second sealing rings are joined together in a mating relationship.

3 Claims, 2 Drawing Figures

DOUBLE RING PISTON SEALING ARRANGEMENT

TECHNICAL FIELD

The present invention relates generally to piston ring sealing construction.

BACKGROUND OF THE INVENTION

The prior art is replete with piston ring sealing constructions as is evidenced by U.S. Pat. Nos. 4,185,842; 4,206,930; 3,751,047; and, 4,111,438.

While all of the above mentioned prior art structures are adequate for their intended purposes, they are deficient in a number of regards.

Basically, the pistons in most internal combustion enginges have two, or in some models, three compression rings that fit in grooves around the piston and hold constant tension against the cylinder wall, to prevent the loss of power and compression by "blow by". The open ends of the rings are cut square and gauged for the proper clearance to allow for expansion due to heat, so when the engine is at running temperature, they make a perfect fit around the cylinder wall. This method works quite well in a new or properly reconditioned engine. Unfortunately, as the engine is used, the normal wear on both the rings and the cylinder wall causes a wider gap between the ends of the rings. The rings normally still will have perfect contact with the cylinder wall, except for the hole straight through each ring and this gap keeps getting wider as the engine is used. This is where the "blow by" occurs. It also causes excessive oil consumption and dirty spark plugs, valves, and oil. The oil ring is then subsequently seized in its groove by carbon caused by the product of combustion getting by the compression rings and causing excess heat at the oil ring. Burned oil is simply baked on until the ring can't function properly. If the "blow by" problem is solved, the oil ring will function properly and need not be redesigned. At this point, there is usually nothing else wrong with the engine, but it gets a major overhaul because it has to be completely disassembled to put in new rings.

With the foregoing problems in mind, it became fairly apparent that improvements were necessary in the prior art constructions to produce a piston ring sealing arrangement with improved performance characteristics and none of the problems enumerated above.

SUMMARY OF THE INVENTION

The present invention comprises a novel dual compression ring sealing arrangement wherein the rings are in mating relationship with one another; and have their ring openings off-set with respect to one another; whereby, as each ring gap expands it exposes a contiguous surface on the opposing ring.

This relationship will substantially reduce the problems associated with the "blow-by" phenomenon, and substantially prolong the useful life of the oil ring. This arrangement will also prolong the useful life of the bearings and valves by controlling oil consumption, and preventing carbon particles from contaminating the valves, plugs, firing chamber, etc.

In essence, the invention comprises a pair of compression rings having a complementary recess and/or projection formed on each of the rings; whereby, when the compression rings are joined together in a mating relationship, the ring gap on each ring is off-set from the ring gap on the opposed ring.

BRIEF DESCRIPTION OF THE DRAWINGS

These and other objects, advantages and novel features of the invention will become apparent from the detailed description of the best mode for carrying out the invention which follows, particularly when considered in conjunction with the accompanying drawings, wherein.

BEST MODE FOR CARRYING OUT THE INVENTION

Figures 1, 2:
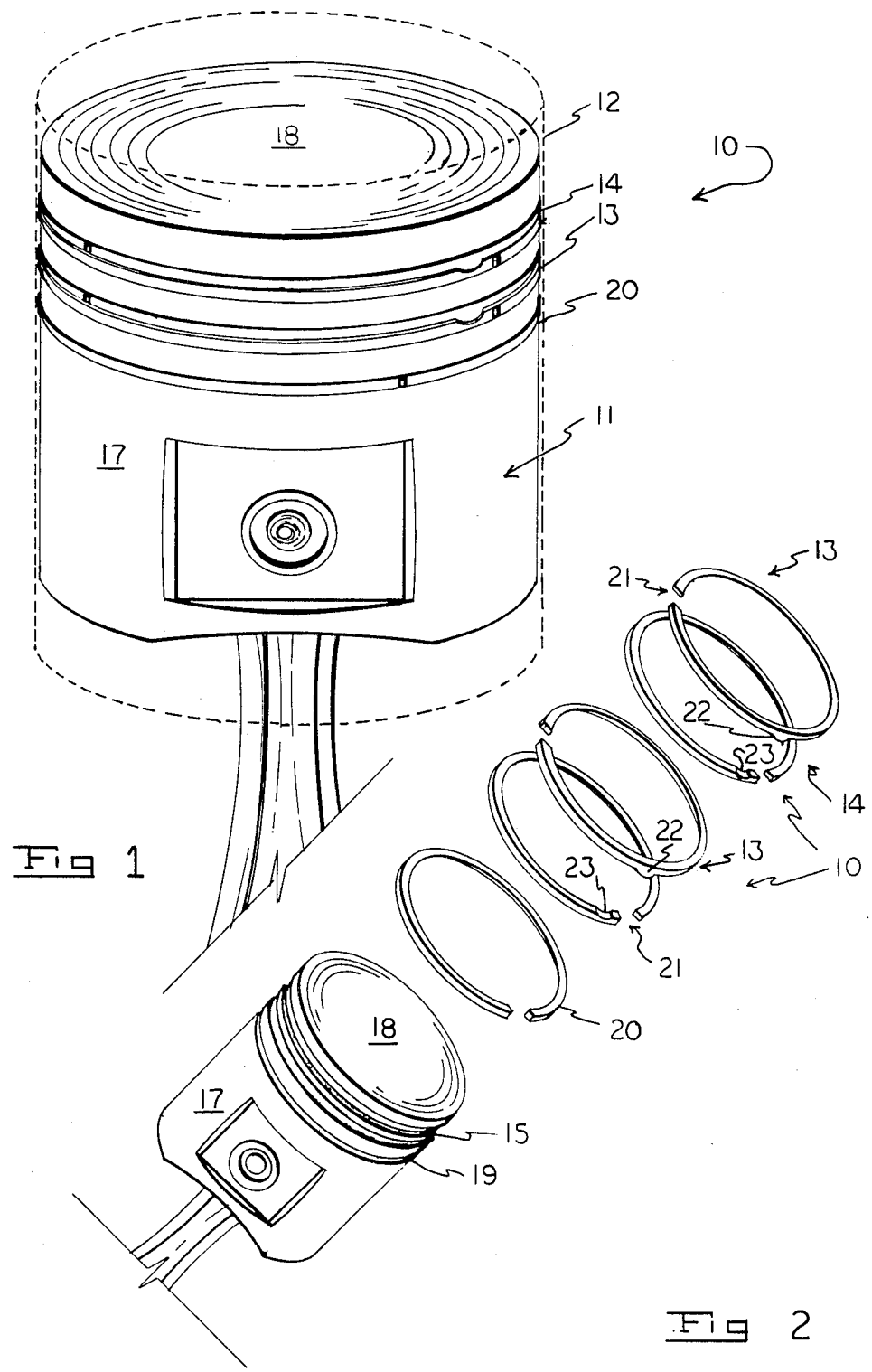
FIG. 1 is a perspective view of the improved dual compression ring arrangement of the present invention disposed on an automotive piston.
FIG. 2 is an exploded perspective view of the improved dual compression ring arrangement.

As can be seen by reference to FIGS. 1 and 2, the improved dual compression ring sealing arrangement is designated generally by the numeral (10). Prior to embarking upon a detailed description of the invention it should be noted that, while the dual compression ring sealing arrangement (10) is depicted in use on an automotive piston, this is for illustration and explanation purposes only and the present invention may be employed with equally successful results in any type of piston and cylinder environment, such as air compressors, pumps, hydraulic cylinders, etc.

Basically, the invention is intended to be employed in conjunction with a piston (11) disposed in a cylinder (12) (shown in phantom) wherein the dual compression ring sealing arrangement (10) comprises a pair of sealing rings (13) and (14) adapted to be joined together and received within at least one of the upper circumferential grooves (15) formed on the piston (11).

In the embodiment illustrated in FIGS. 1 and 2, the automotive piston (11) is disposed in a combustion cylinder (12). The piston head (17) is normally provided with at least one upper circumferential groove (15) disposed proximate to, but spaced from the piston face (18). In addition, the piston head (17) is further provided with another lower circumferential groove (19), which is disposed below the upper circumferential groove (15), and dimensioned to receive an oil ring (20).

As can be seen from the drawings, this invention involves a pair of interlocking or mating sealing rings (13) and (14) disposed in an individual piston groove (15).

Both of the sealing rings (13) and (14) are provided with a narrow gap (21) which allows the rings to be secured on the piston head (17) in a well recognized manner. In addition, one of the sealing rings (13) is provided with a protrusion (22) that is spaced a substantial distance from the gap (21) and, the other sealing ring is provided with a complementary recess (23) that is disposed proximate to the gap (21).

When sealing rings (13) and (14) are brought together in a mating relationship as depicted in FIG. 1, the gaps (21) of the respective rings are off-set in a substantial distance fom one another. The cooperation between the protrusion (22) and the recess (23) prevents the rings (13) and (14) from relative movement with respect to one another, within the piston grooves (15). In addition, the off-set relationship between the gaps (21) on the respective rings (13) and (14) virtually eliminate the "blow by" of pressurized gases past the dual ring sealing arrangement (10).

As shown in the drawings, the recess (23) on one of the sealing rings (14) is disposed proximate the sealing ring gap (21). The primary reasons for this choice of location for the recess (23) are that the formation of the recess (23) structurally weakens the sealing ring (14); and, should the sealing ring fracture at this weakened portion, it would be desirable to have the failure occur as close to the ring gap (21) as possible.

By virtue of the sealing arrangement herein described, compressed gases passing through the sealing ring gap (21) in either of the sealing rings (13) or (14) will encounter a solid span of the opposed sealing ring. In addition, should the recess (23) ultimately fracture, the fracture will occur as close to the gap (21) as possible, whereby the compressed gases will encounter a solid span of the opposed ring both through the gap (23) and the point of fracture.

It should also be noted at this juncture that even in the event of fracture, the protrusion (22) will only allow limited relative movement between the sealing rings (13) and (14), inasmuch as the fractured portion of the recessed ring (13) will be restricted in movement by the remaining integral portions of the sealing ring (13).

Having thereby disclosed the subject matter of this invention, it should be obvious that many substitutions, modifications and variations of the invention are possible in light of the foregoing teachings. It is therefore to be understood that the invention as taught and described herein is only to be limited to the extent of the breadth and scope of the appended claims.

I claim:

1. An improved dual ring sealing arrangement for a piston having at least one circumferential groove formed therein, wherein the sealing arrangement consists of:
    a first sealing ring having a gap and generally flat top and bottom surfaces, wherein one of said surfaces is provided with a single recess proximate said gap; and,
    a second sealing ring having a gap, and generally flat top and bottom surfaces, wherein one of said surfaces is provided with a single protrusion spaced a substantial distance form said ring gap and dimensioned to matingly engage said single recess in said first sealing ring.

2. An improved sealing arrangement as in claim 1; wherein,
    the gap in the said first sealing ring and the gap in said second sealing ring are off-set from one another when the first and second sealing rings are engaged in said mating relationship.

3. An improved sealing arrangement as in claim 1; wherein,
    the first and second sealing rings are adapted to be received in said at least one circumferential groove in the piston when said first and second sealing rings are disposed in their mating relationship.

* * * * *